(12) United States Patent
Murakami (10) Patent No.: US 11,956,537 B2
(45) Date of Patent: Apr. 9, 2024

(54) LOCATION POSITIONING DEVICE FOR MOVING BODY AND LOCATION POSITIONING METHOD FOR MOVING BODY

(71) Applicant: CASIO COMPUTER CO., LTD., Tokyo (JP)

(72) Inventor: Taichi Murakami, Hino (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 17/682,244

(22) Filed: Feb. 28, 2022

(65) Prior Publication Data
US 2022/0303468 A1 Sep. 22, 2022

(30) Foreign Application Priority Data

Mar. 19, 2021 (JP) .................................. 2021-045316
Aug. 31, 2021 (JP) .................................. 2021-142003

(51) Int. Cl.
*G06T 7/70* (2017.01)
*H04N 23/68* (2023.01)
*H04N 23/695* (2023.01)

(52) U.S. Cl.
CPC ............. *H04N 23/682* (2023.01); *G06T 7/70* (2017.01); *H04N 23/6812* (2023.01);
(Continued)

(58) Field of Classification Search
CPC .... H04N 23/682; H04N 23/60; H04N 23/695; H04N 23/90; H04N 23/69;
(Continued)

(56) References Cited

U.S. PATENT DOCUMENTS 7,627,197 B2 * 12/2009 Aoyama ................. G01S 17/42
  382/152
2006/0146142 A1 * 7/2006 Arisawa ................. G01C 11/06
  348/E5.042

(Continued)

FOREIGN PATENT DOCUMENTS

JP     H10-115506 A    5/1998
JP     2003-042760 A   2/2003
(Continued)

OTHER PUBLICATIONS

JPO; Application No. 2021-142003; Notice of Reasons for Refusal dated Apr. 4, 2023.

*Primary Examiner* — Abdelaaziz Tissire
(74) *Attorney, Agent, or Firm* — Fitch, Even Tabin & Flannery LLP (57) ABSTRACT

A location positioning device for a moving body acquires, via a communication device, a captured image from a camera in which an imaging direction has changed from a first direction to a second direction, the captured image including at least one marker disposed in space and at least one moving body that moves in the space, detects, based on the captured image and initial data, a change of the imaging direction from the first direction to the second direction, and acquires, based on the captured image, location data of the at least one moving body without returning the imaging direction of the camera in a real world to the first direction from the second direction.

24 Claims, 7 Drawing Sheets

(52) U.S. Cl.
CPC . *H04N 23/695* (2023.01); *G06T 2207/30204* (2013.01); *G06T 2207/30244* (2013.01)

(58) Field of Classification Search
CPC .... H04N 23/6812; H04N 7/181; H04N 23/62; H04N 23/631; H04N 23/635; H04N 23/681; H04N 5/2628; H04N 23/58; H04N 23/685; H04N 13/221; H04N 21/21805; H04N 1/32352; H04N 13/279; G06T 7/70; G06T 7/73; G06T 2207/30204; G06T 2207/30244; G06T 2207/10016; G06T 7/246; G06T 7/20; G06T 2207/30232; G06T 2207/30208; G06T 7/85; G06T 2211/428; G01C 11/02; G01C 11/04; H04B 10/116
See application file for complete search history.

(56) References Cited

U.S. PATENT DOCUMENTS

| | | | | |
|---|---|---|---|---|
| 2016/0091892 | A1* | 3/2016 | Okita | B25J 9/1674 700/121 |
| 2019/0371000 | A1* | 12/2019 | Suzuki | H04N 23/695 |
| 2022/0058826 | A1* | 2/2022 | Hasegawa | G01B 11/00 |

FOREIGN PATENT DOCUMENTS

| | | | |
|---|---|---|---|
| JP | 2003042760 A | * | 2/2003 |
| JP | 2013-219628 A | | 10/2013 |
| JP | 2016-070693 A | | 5/2016 |
| JP | 2016-225719 A | | 12/2016 |

* cited by examiner

FIG. 7

LOCATION POSITIONING DEVICE FOR MOVING BODY AND LOCATION POSITIONING METHOD FOR MOVING BODY

CROSS-REFERENCE TO RELATED APPLICATION

This application claims the benefit of Japanese Patent Application No. 2021-045316, filed on Mar. 19, 2021, and Japanese Patent Application No. 2021-142003 filed on Aug. 31, 2021, the entire disclosure of which is incorporated by reference herein.

FIELD

The present disclosure relates to a location positioning device for a moving body and a location positioning method for a moving body.

BACKGROUND

In the related art, when carrying out surveying/location detection using visible light, typically, the camera is calibrated each time the camera is placed, and very short-term measuring is performed. As such, when a stationary camera is used, the camera placement conditions shift from the initial values due to external factors such as cleaning of the camera, earthquakes, and the like, and aging factors such as loosening of screws and the like. Consequently, problems occur such as declines in location detection accuracy. Currently, the camera must be recalibrated to restore the location detection accuracy.

Unexamined Japanese Patent Application Publication No. 2013-219628 describes a camera system that stores a reference image in which a detection area is captured at the time of placement of a camera and location information about a reference point set in that reference image, periodically detects an amount of shift of the reference point between a captured image of the camera and the reference image, and drives a camera platform on the basis of the detected amount of shift.

SUMMARY

However, when driving the camera platform, recalibrating, or the like, the system must be stopped for an extended period of time, thereby affecting on-site work.

The present disclosure enables location positioning to be continued in a satisfactory manner, even when the direction the camera is facing changes from a state at initial placement due to various factors.

A location positioning device for a moving body according to Embodiment 1 of the present disclosure includes:
a communication device; and
at least one processor configured to
acquire, via the communication device, a captured image from a camera in which an imaging direction has changed from a first direction to a second direction, the captured image including at least one marker disposed in space and at least one moving body that moves in the space,
detect, based on the captured image and initial data, a change of the imaging direction from the first direction to the second direction, and
acquire, based on the captured image, location data of the at least one moving body without returning the imaging direction of the camera in a real world to the first direction from the second direction.

A location positioning device for a moving body according to Embodiment 2 of the present disclosure includes:
a communication device; and
at least one processor configured to
acquire, via the communication device, a captured image in which a plurality of markers disposed in space is captured, from a camera that is fixed to a moving body and in which an imaging direction has changed from a first direction to a second direction,
detect, based on the captured image and initial data, a change of the imaging direction from the first direction to the second direction, and
acquire, based on the captured image acquired from the camera, location data of the moving body without returning the imaging direction of the camera in a real world to the first direction from the second direction.

In Embodiment 1, the marker is placed on the moving body side and the camera is not placed on the moving body side. Meanwhile, in Embodiment 2, the camera is placed on the moving body side and the markers are not placed on the moving body side.

BRIEF DESCRIPTION OF THE DRAWINGS

A more complete understanding of this application can be obtained when the following detailed description is considered in conjunction with the following drawings, in which.

DETAILED DESCRIPTION

Hereinafter, as a location positioning system according to embodiments of the present disclosure, a visible light communication system is described while referencing the drawings.

Embodiment 1

Figure 1:
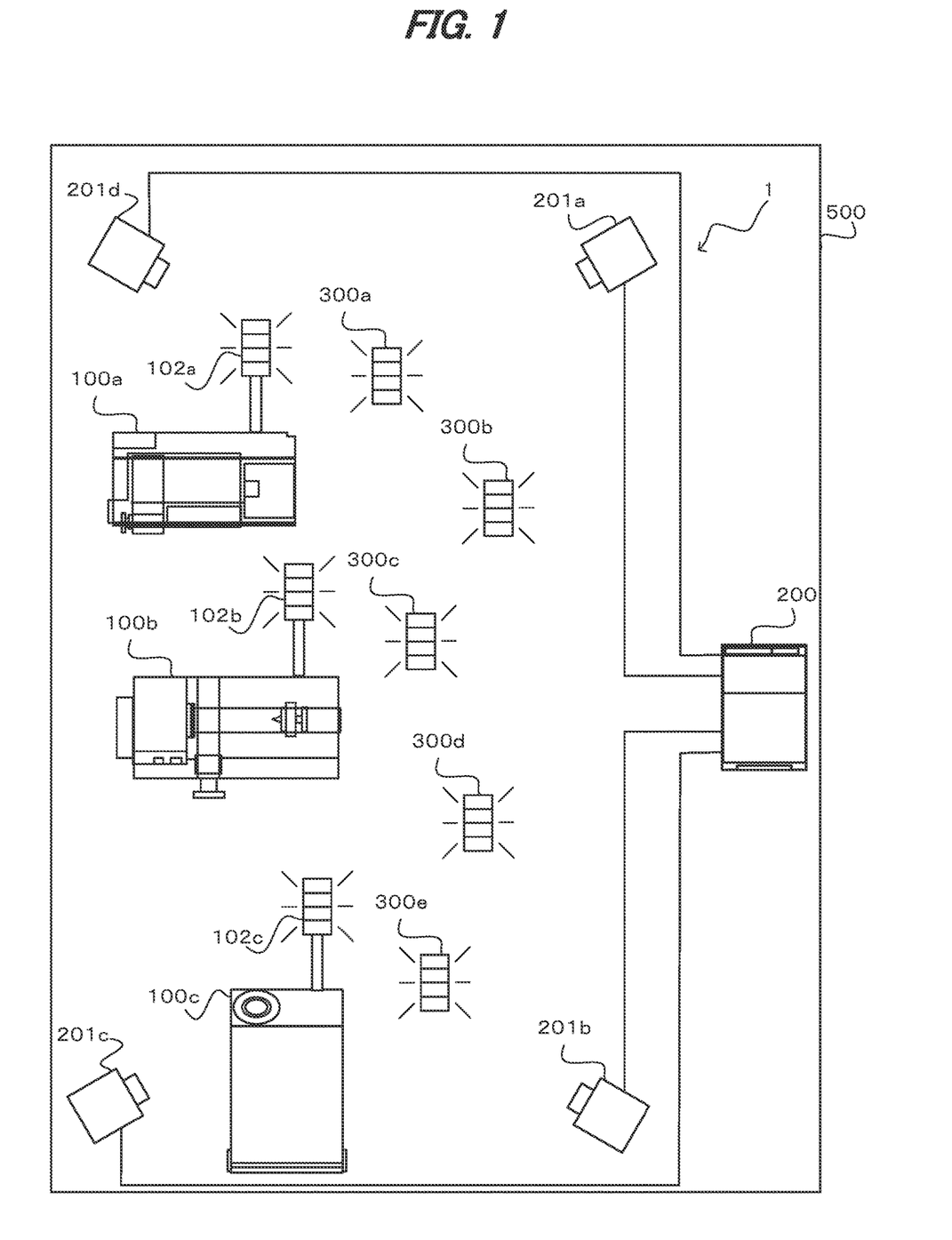
FIG. 1 is a drawing illustrating an example of a visible light communication system according to Embodiment 1 of the present disclosure.

FIG. 1 is a drawing illustrating the configuration of a visible light communication system 1. As illustrated in FIG. 1, the visible light communication system 1 includes moving bodies 100a, 100b, 100c (hereinafter, when not limiting to the moving body 100a, 100b, or 100c individually, the moving bodies 100a, 100b, and 100c are appropriately referred to as the "moving body 100") placed in a space 500, and a server 200 corresponding to the location positioning device.

A light source 102a is attached to the moving body 100a, a light source 102b is attached to the moving body 100b, and a light source 102c is attached to the moving body 100c (hereinafter, when not limiting to the light source 102a, 102b, or 102c individually, the light sources 102a, 102b, and 102c are appropriately referred to as the "light source 102"). Cameras 201a, 201b, 201c, 201d corresponding to imaging devices are attached to the server 200 (hereinafter, when not limiting to the camera 201a, 201b, 201c, or 201d individually, the cameras 201a, 201b, 201c, and 201d are appropriately referred to as the "camera 201"). The camera 201 is fixed in space 500 by a placement tool such as a camera platform or the like. Additionally, markers 300a, 300b, 300c, 300d, 300e, that are fixed points having locations that do not change, are placed in the space 500 (hereinafter, when not limiting to the marker 300a, 300b, 300c, 300d, or 300e individually, the markers 300a, 300b, 300c, 300d, and 300e are appropriately referred to as the "marker 300"). The marker 300 and the light source 102 include a non-illustrated light emitting diode (LED). The light source 102 corresponds to a location positioning target.

In the present embodiment, the light source 102 attached to the moving body 100 transmits information by emitting light corresponding to various types of information to be transmitted, such as the state of the moving body 100 and the like. The server 200 demodulates changes in emission colors in images of light obtained as a result of chronologically continuous imaging by the camera 201 to acquire the information emitted by the light source 102.

In the present embodiment, initially, the locations and imaging directions of the cameras 201a to 201d are unknown. As such, prior to the server 200 acquiring the state of the moving body 100 or the like, the camera parameters of each camera are obtained, and calibration for obtaining correspondence between a virtual world recognized by the cameras 201a to 201d and space in the real world is performed. Due to this calibration, the captured images acquired by the camera 201 are corrected so as to reduce distortion. The camera parameters include internal parameters and external parameters of each camera. The internal parameters are camera-specific parameters, namely a matrix that transforms camera coordinates to image coordinates, include the focal distance and optical center position of the lens, and are not changed by calibration. The external parameters are a matrix that transforms world coordinates to camera coordinates, and include information about the location/direction of the camera 201 in the space 500. The server 200 calculates the camera parameters on the basis of the location (two-dimensional coordinate information) of each image of the markers 300a, 300b, 300c, 300d, 300e in the images obtained by the imaging of the cameras 201a to 201d. The calculated camera parameters are stored in the server 200 as initial data.

Figure 2:
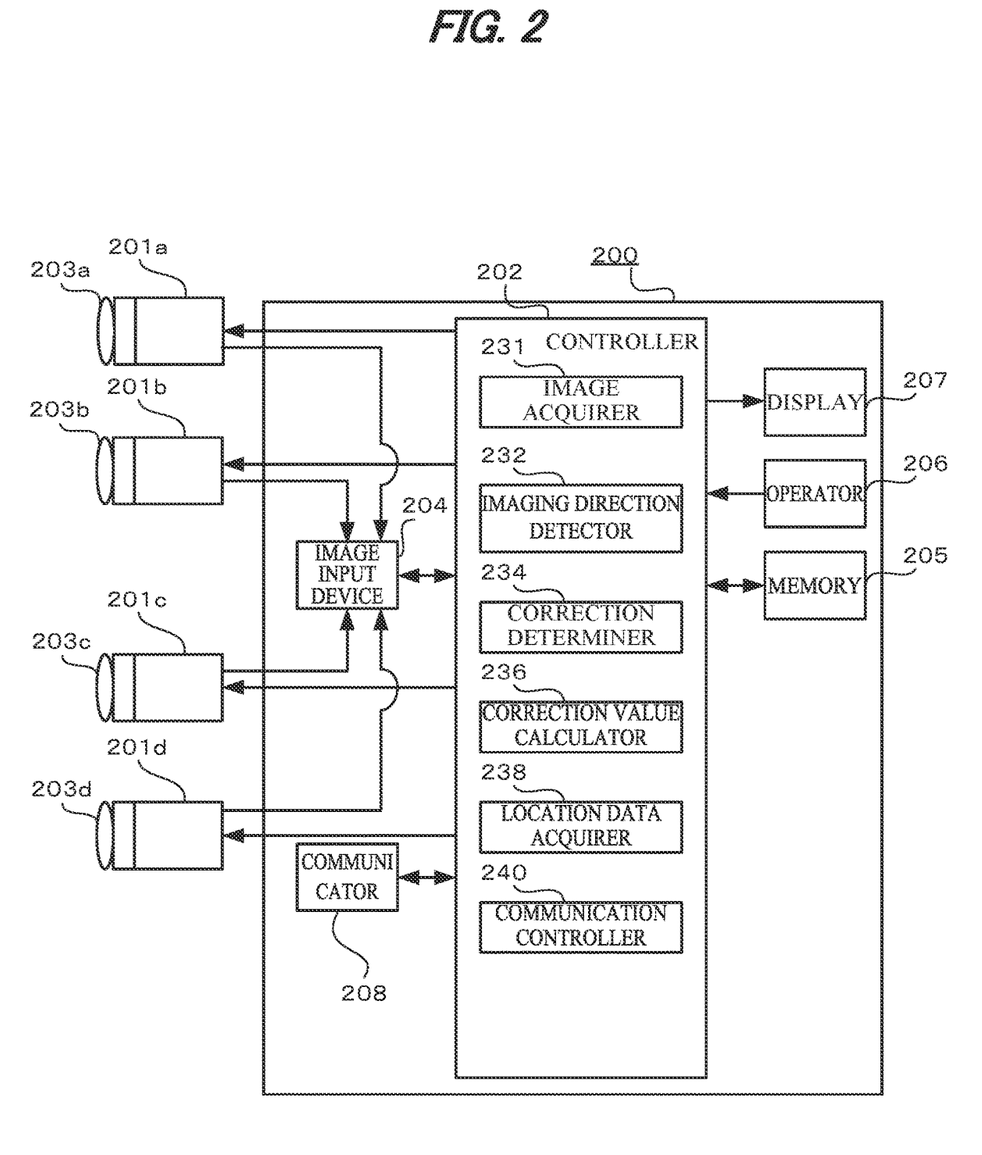
FIG. 2 is a drawing illustrating an example of a server according to Embodiment 1 of the present disclosure.

FIG. 2 is a drawing illustrating an example of the configuration of the server 200. As illustrated in FIG. 2, the server 200 includes a controller 202, an image input device 204, a memory 205, an operator 206, a display 207, and a communicator 208. The cameras 201a to 201d are attached to the server 200 via wiring. However, the server 200 and the cameras 201a to 201d may be wirelessly connected each other.

The camera 201a includes a lens 203a, the camera 201b includes a lens 203b, the camera 201c includes a lens 203c, and the camera 201d includes a lens 203d (hereinafter, when not limiting to the lens 203a, 203b, 203c, or 203d individually, the lenses 203a, 203b, 203c, and 203d are appropriately referred to as the "lens 203"). The lens 203 is configured from a zoom lens or the like. The lens 203 moves due to a zoom control operation from the operator 206 and focusing control by the controller 202. An imaging field angle and an optical image captured by camera 201 are controlled by the movement of the lens 203.

The cameras 201a to 201d include a plurality of light receiving elements arranged regularly in two dimensions on a light receiving surface. In one example, the light receiving elements are implemented as charge coupled devices (CCD), complementary metal oxide semiconductors (CMOS), or similar imaging devices. The cameras 201a to 201d image (receive), on the basis of control signals from the controller 202, optical images received through the lens 203 at an imaging field angle that has a predetermined range, and converts an image signal in that imaging field angle to digital data to generate a frame. The cameras 201a to 201d continuously carry out the imaging and frame generation over time, and output successive frames to the image input device 204 of the server 200.

The frames (digital data) output from the camera 201 are input into the image input device 204 on the basis of the control signals from the controller 202.

In one example, the controller 202 includes a central processing unit (CPU). The controller 202 controls the various functions of the server 200 by executing software processing in accordance with a program stored in the memory 205 (program for realizing the operations of the server 200 illustrated in FIG. 3 (described later)).

In one example, the memory 205 is implemented as a random access memory (RAM), a read-only memory (ROM), or the like. The memory 205 stores various types of information (programs and the like) that are used in the control and the like carried out by the server 200. Additionally, the captured images captured at the time of calibration at initial placement of the cameras 201a to 201d, and the calculated camera parameters are stored in the memory 205 as initial data.

The operator 206 includes a ten-key, function keys, or the like, and is an interface used to input operation content of a user. The display 207 is configured from, for example, a liquid crystal display (LCD), a plasma display panel (PDP), an electro luminescence (EL) display, or the like. The display 207 displays images in accordance with image signals output from the controller 202. In one example, the communicator 208 is implemented as a local area network (LAN) card. The communicator 208 communicates with external communication devices on the basis of control by a communication controller 240.

The controller 202 includes an image acquirer 231, an imaging direction detector 232, a correction determiner 234, a correction value calculator 236, a location data acquirer 238, and the communication controller 240.

For the frames (digital data) output from each camera 201 and input into the image input device 204, the image acquirer 231 performs peripheral darkening correction and distortion correction and adjusts the image quality and image size in order to display the frames on the display 207 as through images. Additionally, the image acquirer 231 has a function of, when a control signal based on a store command operation from the operator 206 is input, encoding, in a compression encoding format such as joint photographic experts group (JPEG) or the like, or converting, to a file, the optical image in the imaging field angle of the camera 201 or in a display range displayed on the display 207. Here, the optical image is from the point in time at which the storing is commanded.

After obtaining the camera parameters for every combination of two cameras 201 (camera pair), the location data acquirer 238 detects the light of a cyclic three-color pattern included in each image obtained from the image acquirer 231 by the imaging by the cameras 201a to 201d.

The light sources 102a, 102b, 102c respectively attached to the moving bodies 100a, 100b, 100c emit light that cyclically changes in a desired pattern of three colors, namely red (R), green (G), and blue (B). The pattern is modulated so that an identification (ID) can be recognized. Here, the ID can uniquely identify each of the light sources 102a, 102b, 102c. However, this is merely an example and, provided that each of the light sources 102a, 102b, 102c can be uniquely identified, the emission color need not necessarily cyclically change in a desired pattern of the three colors of red (R), green (G), and blue (B).

The location data acquirer 238 detects the three-color emission pattern, and attempts to demodulate to the ID. In one example, when the location data acquirer 238 can detect the same ID from both of the images obtained by the imaging performed by the two cameras 201 of the camera pair, it is regarded that the light source 102 corresponding to that ID has been detected. Note that, even in the case of a captured image from one camera 201, provided that a marker that is a fixed point is captured in that captured image, the location of the moving body provided with the emitter included in that captured image can be calculated.

Next, for each camera pair, the location data acquirer 238 acquires a location (Xga2, Yga2) of an image of the light source 102 on an imaging plane of one camera 201 of the two cameras 201 of that camera pair, and a location (Xgb2, Ygb2) of an image of the light source 102 on an imaging plane of the other camera 201 of the two cameras 201 of that camera pair. Furthermore, the location data acquirer 238 uses a combination of the locations (Xga2, Yga2), (Xgb2, Ygb2) of both images and the camera parameters to calculate a placement location (Xk2, Yk2, Zk2) of world coordinates of the light source 102 in the space 500.

After the placement of the cameras 201a to 201d, the imaging direction detector 232 detects the imaging directions of the cameras 201a to 201d constantly, periodically, or on the basis of a user command. The imaging direction detector 232 detects changes in the imaging directions of the cameras 201a to 201d to detect shifts, from the initial placement of the camera placement conditions, caused by the external factors and/or the aging factors after camera placement.

The imaging direction detector 232 detects the location (two-dimensional coordinate information) of the image of the marker 300 in each image obtained by the imaging by the cameras 201a to 201d. Here, it is assumed that the placement locations of the markers 300a, 300b, 300c, 300d, 300e in the space 500 (three-dimensional coordinate information of the world coordinate system) are known. The markers 300a, 300b, 300c, 300d, 300e emit light that cyclically changes in patterns of three colors, namely red (R), green (G), and blue (B). The patterns are modulated so that an ID capable of uniquely identifying each of the markers 300a, 300b, 300c, 300d, 300e can be recognized.

The imaging direction detector 232 sets combinations of two cameras 201 (camera pair) for the cameras 201a to 201d. From the four cameras 201, six patterns (six types) of combinations (camera pairs) of two arbitrary cameras 201 are obtained.

The imaging direction detector 232 detects the light of the cyclic three-color pattern included in each image obtained by the imaging by the cameras 201a to 201d. Furthermore, the imaging direction detector 232 attempts to demodulate to an ID corresponding to each three-color emission pattern. The placement location of each of the markers 300a, 300b, 300c, 300d, and 300e and the ID are associated and stored as the initial data (including the world coordinate data of each marker that is a fixed point) in the memory 205.

The imaging direction detector 232 attempts to detect a modulated light region (a pixel region having a specific size and shape and having a brightness value greater than or equal to a predetermined value) from the images acquired from the image acquirer 231 by the imaging by each of the cameras 201a to 201d. Here, the modulated light region is light that is modulated according to the ID. When a modulated light region is detected, it is considered that the marker 300 corresponding to that ID is detected. The imaging direction detector 232 calculates the placement location of the marker 300 corresponding to the ID.

The imaging direction detector 232 compares the images captured by the cameras 201a to 201d with the captured images at initial placement of the cameras 201a to 201d that are the initial data, and detects a change of the imaging direction of each of the cameras 201a to 201d on the basis of the image location or the placement location of the marker 300 included in the captured images.

The correction determiner 234 determines whether to correct a fluctuation in the imaging direction for the cameras 201a to 201d on the basis of the changes of the imaging directions detected by the imaging direction detector 232. In this case, the "correction" is processing for calculating a correction value that corrects the external parameters, namely the information about the location and direction of the camera 201 in the space 500, thereby correcting so as to eliminate the fluctuation in the imaging direction.

The correction determiner 234 determines whether to perform the correction on the basis of two standpoints, namely, (1) whether correction is necessary, and (2) whether correction is possible. The correction determiner 234 determines whether to perform correction on the basis of whether the change (shift) of the image location or placement location of the marker 300 included in the captured image from the image location or placement location of the marker 300 included in the captured image captured at the initial camera placement reaches a set threshold. The threshold is stored in advance in the memory 205 for each camera, and the correction determiner 234 reads the threshold from the memory 205 to execute the determination processing. Additionally, the threshold includes a threshold for determining whether correction is necessary and a threshold for determining whether correction is possible.

The correction value calculator 236 calculates the correction value for cases in which the correction determiner 234 determines that correction is both possible and necessary. The correction value calculator 236 calculates, as the correction value, a correction value parameter for correcting the external parameters, namely the information about the location and direction of the camera 201. Specifically, the correction value calculator 236 calculates the correction value from an inverse matrix of a fluctuation parameter of the external parameters. Details of this calculation are given below.

Typically, the relationship between world coordinates [Wp] in three-dimensional space and image coordinates [u, v] in a two-dimensional image is expressed using a perspective projection matrix or the like as in the following equation by using the internal parameters [A] and the external parameters [E] of the camera.

Equation 1

$$[u,v]=[A][E][Wp] \quad (1)$$

Next, when, after placement of the camera, the imaging direction of the camera, that is the placement condition of the camera, fluctuates due to external factors and/or aging factors and the image coordinates of the two-dimensional image change from [u, v] to [u', v'], the relationship between the world coordinates [Wp] in three-dimensional space and the image coordinates [u', v'] in the two-dimensional image is expressed as follows.

Equation 2

$$[u',v']=[A][E][E'][Wp] \quad (2)$$

Here, [E'] is a parameter of the amount of fluctuation with respect to the external parameter [E] caused by fluctuation in the imaging direction of the camera. Note that the internal parameter [A] of the camera is a camera-specific parameter, and does not change even when the placement condition of the camera changes. In Equation (2), the factor whereby the image coordinates change from [u, v] to [u', v'] is caused by the parameter [E'] of the amount of fluctuation with respect to the external parameter [E]. Accordingly, a correction value $[E']^{-1}$ is calculated by determining an inverse matrix for this parameter [E'] of the amount of fluctuation, and the coordinates are corrected by multiplying the inverse matrix by this correction value.

In order to calculate the correction value $[E']^{-1}$ by determining an inverse matrix, the camera pair must capture a common marker, or one camera must capture two or more markers.

In cases other than those described above, that is, when one camera captures one marker, the correction value $[E']^{-1}$ cannot be calculated by determining an inverse matrix. In such a case, the correction value calculator 236 selects a parameter that is the correction value $[E']^{-1}$ by brute forcing a combination of rotation angles around each coordinate axis of the camera coordinate system. Here, when the camera platform that fixes the camera is a rotational platform in which, of the three axes, namely pan axis, which is the horizontal movement of the camera, the tilt axis, which is the vertical movement of the camera, and the roll axis, which is the rotation around the optical axis of the camera, two axes, namely the pan and tilt axes can be adjusted, the number of brute force combinations can be reduced by using combinations consisting of the rotation angles of only the pan and the tilt. Furthermore, the number of combinations to be brute forced can be reduced in accordance with the movable ranges of the pan and tilt adjustments and the adjustment resolution that is a movable unit.

The correction value calculator 236 stores, in the memory 205, the correction value $[E']^{-1}$ obtained by calculating the inverse matrix or brute forcing combinations of the rotation angles.

Figure 3:
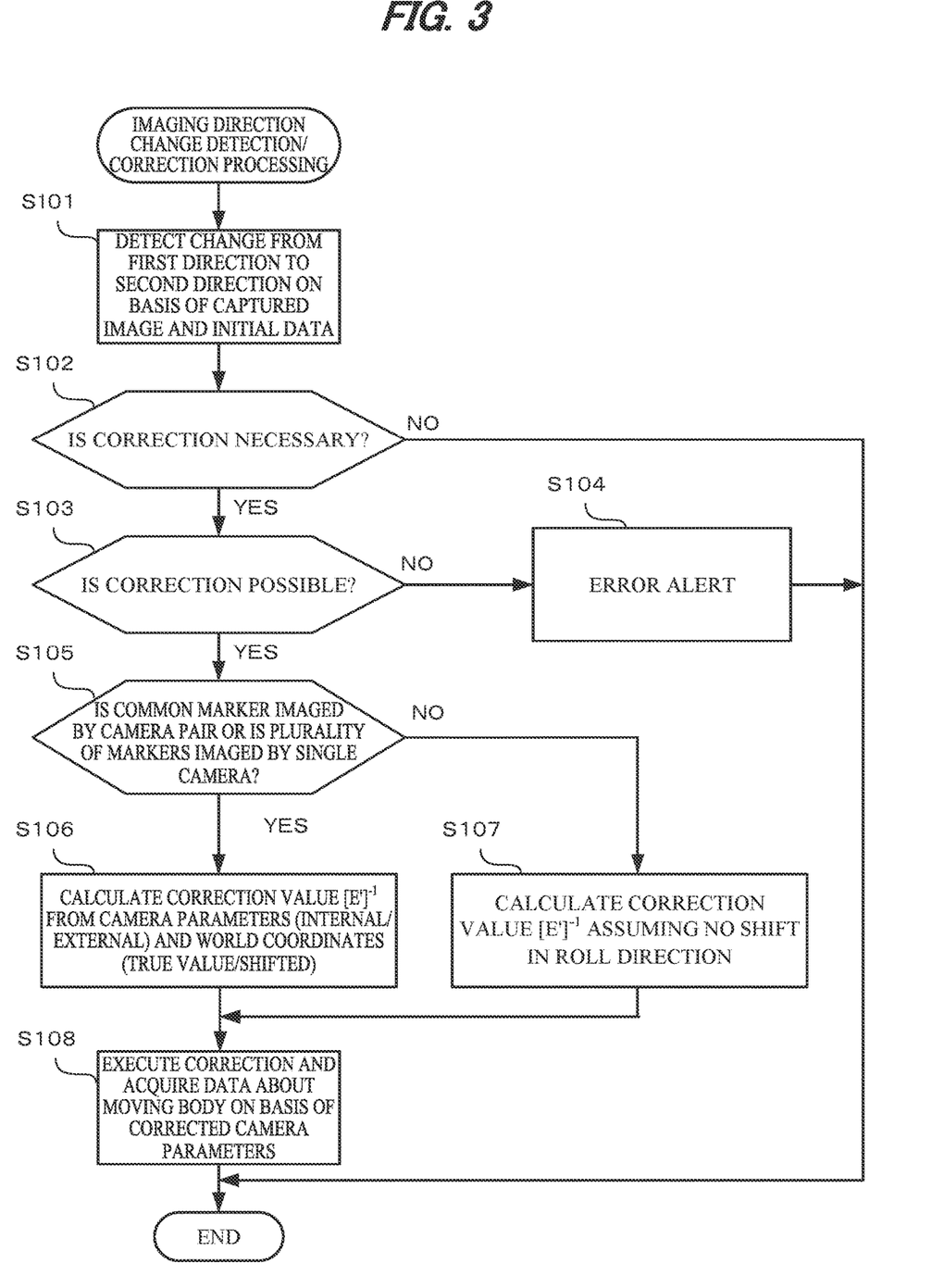
FIG. 3 is a flowchart illustrating an example of imaging direction change detection/correction processing according to Embodiment 1 of the present disclosure.

Next, the operations of the server 200 are described while referencing a flowchart. FIG. 3 is a flowchart illustrating an example of the operations of imaging direction change detection/correction processing carried out by the server 200. This processing may be constantly carried out while the location positioning of the moving body 100 in the space 500 is being executed, may be periodically carried out, or may be carried out on the basis of a command from a user.

The cameras 201a to 201d perform imaging in the space 500. The imaging direction detector 232 of the controller 202 compares the captured images of the cameras 201a to 201d acquired by the image acquirer 231 with the captured images of the cameras 201a to 201d at initial camera placement, which is the initial data read from the memory 205. Specifically, the image locations or the placement locations of markers 300 that are included in the captured images and that have the same ID are compared. A change from a first direction, that is the imaging direction of the cameras 201a to 201d at initial camera placement, to a second direction is detected, on the basis of the comparison, for the imaging directions of the cameras 201a to 201d newly acquired by the image acquirer 231 (step S101). Note that the term "first direction" as defined in the present specification is the imaging direction of the camera fixed by fixing means when the system is installed, during system operation, or when calibration of the camera is executed.

The camera 201 is initially fixed facing the first direction by the fixing means that fix the camera 201. However, due to external factors including earthquakes and aging factors including loosening of fasteners such as screws, the direction that the camera 201 faces may shift from the first direction to a direction other than the first direction (the second direction). In the present embodiment, even when the direction in which the fixing means fixes the camera physically shifts, an operation for physically changing (reversing) that shift is not necessary.

Next, the correction determiner 234 of the controller 202 determines whether correction of the external parameter is needed on the basis of the change of the imaging direction detected by the imaging direction detector 232 (step S102).

The correction determiner 234 compares, with a threshold, the change (shift) of the image location or placement location of the marker 300 included in the captured image from the image location or the placement location of the marker 300 at initial placement of the camera 201. When the amount of change from the first direction that is the imaging direction at initial placement of the camera 201 to the second direction that is the current imaging direction is greater than or equal to the threshold, a determination is made that correction of the external parameter is necessary (step S102; YES) and, then, a determination is made whether the correction of the external parameter is possible (step S103). The amount of change from the first direction to the second direction is determined on the basis of an amount of movement of the image location or the placement location of the marker 300. Additionally, when the imaging direction of the camera 201 is greatly shifted, the marker 300 included in the captured image at initial placement is not included in the current captured image, and a common marker 300 does not exist, the imaging direction detector 232 cannot detect the amount of change. As such, the correction determiner 234 determines that correction is necessary when the amount of change cannot be detected as well.

When the amount of change from the first direction that is the imaging direction at initial placement of the camera 201 to the second direction that is the current imaging direction is slight, there is no change, or the amount of change is less than the threshold, the correction determiner 234 determines that correction of the external parameter is not necessary (step S102; NO) and ends the processing.

Next, in step S103, the correction determiner 234 determines whether correction of the external parameter is possible from the current captured image of the camera 201. Specifically, the correction determiner 234 determines whether the image location of the marker 300 included in the captured image is shifted greatly from the center of the image and is located at a corner portion of the image or is outside the field angle. When the location of the marker 300 is shifted greatly from the center of the image and, as such, cannot be adjusted by correcting the external parameter, the correction determiner 234 determines that correction is not possible (step S103; NO) and displays, on the display 207, that there is an error, thereby alerting the user (step S104). Note that the alert is not limited to a visual display, and may be an audio alert. After alerting the user, the controller 202 ends the processing. Then, the alerted user adjusts the placement location of the camera 201.

When the location of the marker 300 is not shifted from the center of the image to a degree that makes adjustment by correcting the external parameter impossible, the correction determiner 234 determines that correction is possible (step S103; YES), and transitions to correction value calculation processing.

Prior to the correction value calculation processing, the correction value calculator 236 of the processor 202 determines whether there is a camera pair that has imaged a common marker 300, or if a single camera 201 has imaged a plurality, that is, two or more, of the markers 300 (step S105). When there is a camera pair that has imaged a common marker 300 or a single camera 201 has imaged two or more of the markers 300 (step S105; YES), the correction value $[E']^{-1}$ is calculated by determining an inverse matrix on the basis of the camera parameters (the internal parameter and the external parameter), the known world coordinates (true values) of the marker 300 stored in the memory 205, and the (shifted) world coordinates of the marker 300 calculated from the current captured image (step S106).

When there is not a camera pair that has imaged a common marker 300 and the camera 201 only captures one marker 300 (step S105; NO), the correction value calculator 236 selects a parameter that is the correction value $[E']^{-1}$ by assuming that, of the rotation angles around the various coordinate axes of the camera coordinate system, there is no shift in the roll direction, and brute forcing combinations of the pan and tilt rotation angles (step S107). Note that, when a camera platform is used that is also adjustable in the roll direction, the correction value $[E']^{-1}$ may be selected by brute forcing combinations in which the roll direction is also changed.

When the correction value $[E']^{-1}$ is obtained in step S106 or step S107, the location data acquirer 238 executes the correction of the camera parameters and acquires the location data of the moving body 100 on the basis of the corrected camera parameters (step S108). The correction value $[E']^{-1}$ is the inverse matrix of the parameter [E'] of the amount of fluctuation with respect to the external parameter [E] caused by fluctuation in the imaging direction of the camera 201. Accordingly, the coordinates are corrected by multiplying the correction value by the parameter [E'] of the amount of fluctuation. The location data acquirer 238 uses the location of the image of the light source 102 of the moving body 100 on the imaging plane of the camera 201 and the camera parameters corrected by multiplying by the correction value to calculate the placement location of the world coordinates of the light source 102 in the space 500. As a result, even when the imaging direction changes from the first direction at initial placement of the camera 201 to the second direction, the location data of the moving body 100 is acquired on the basis of captured images without returning the imaging direction of the camera 201 in the real world to the first direction from the second direction. Thus, calibration is unnecessary even when the direction the camera 201 is facing changes from the state at initial placement due to various factors, and location positioning accuracy can be restored without stopping the system during operation.

Embodiment 2

Next, another embodiment of the present disclosure is described. In the present embodiment, the visible light communication system 1 is the same as illustrated in FIG. 1, and the server 200 is the same as illustrated in FIG. 2. In the present embodiment, the placement locations of the marker 300 and the light source 102 are calculated for each camera pair, and a determination is made about the reliability of the calculated placement locations.

Figure 4:
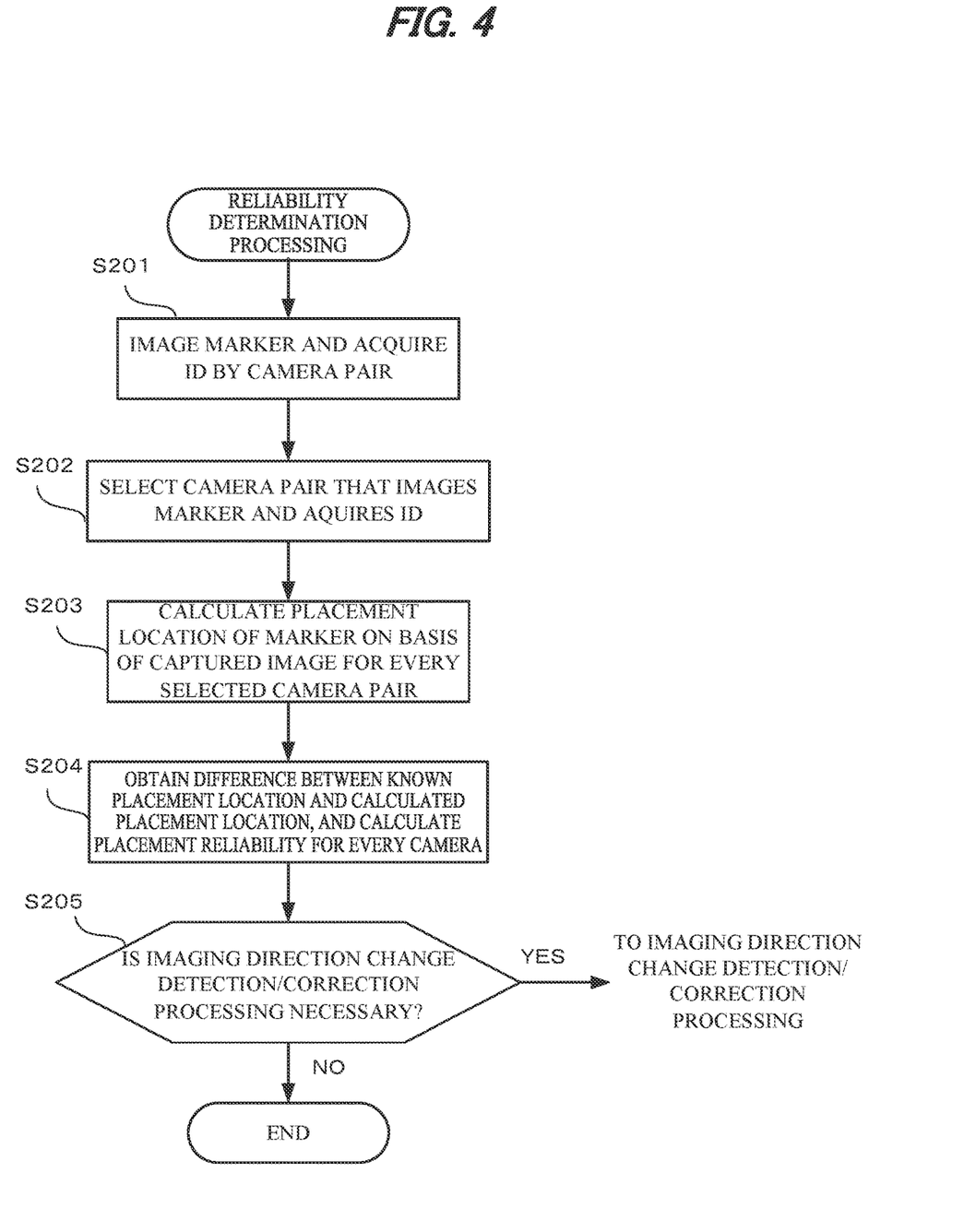
FIG. 4 is a flowchart illustrating an example of reliability determination processing carried out by the server according to Embodiment 2 of the present disclosure.

FIG. 4 is a flowchart illustrating an example of the operations of reliability determination processing carried out by the server 200 according to another embodiment. The operations of FIG. 4 are carried out for each marker 300.

When, for each camera pair, the two cameras 201 included in that camera pair capture the same marker 300, this captured image is acquired via the image input device 204, and the imaging direction detector 232 of the controller 202 attempts to identify the marker 300 by ID acquisition (step S201).

Next, the imaging direction detector 232 selects the camera pair that images the marker 300 in step S201 and for which the ID is acquired (step S202).

Next, for each camera pair selected in step S202, the imaging direction detector 232 calculates the placement location of the marker 300 on the basis of the captured images obtained by the two cameras 201 included in that camera pair (step S203). Specifically, the imaging direction detector 232 acquires the position of the image of the marker 300 in the image obtained by imaging by one camera 201 of the camera pair, and the position of the image of the marker 300 in the image obtained by imaging by the other camera 201 of the camera pair. Furthermore, the imaging direction detector 232 calculates the placement location of the marker 300 using the combination of the two acquired locations and the camera parameters corresponding to the camera pair.

Next, the imaging direction detector 232 calculates the placement reliability for the marker 300 for which the placement location is calculated in step S203 (step S204). For example, with the camera 201a as the center, the placement location of the marker 300c calculated on the basis of the camera pair of the camera 201a and the camera 201b is set to (Xb, Yb, Zb), the placement location of the marker 300c calculated on the basis of the camera pair of the camera 201a and the camera 201c is set to (Xc, Yc, Zc), and the placement location of the marker 300c calculated on the basis of the camera pair of the camera 201a and the camera 201d is set to (Xd, Yd, Zd). Here, it is assumed that all of the camera pairs are capable of imaging the marker 300c at initial camera placement. Since all of the camera pairs calculate the placement location of the marker 300c, it is expected that the calculated values will be the same. The placement location of the marker 300c is known and is stored in advance in the memory 205. The imaging direction detector 232 reads the placement location of the marker 300c from the memory 205 and calculates the difference from the placement locations (Xb, Yb, Zb), (Xc, Yc, Zc), and (Xd, Yd, Zd) of the marker 300c calculated by each camera pair.

The imaging direction detector 232 determines whether the imaging direction change detection/correction processing of FIG. 3 is necessary on the basis of whether the difference calculated for each camera pair is 0 or is within a margin of error (step S205). When there is a camera pair for which the difference calculated for each camera pair exceeds the margin of error (step S205; YES), the imaging direction detector 232 determines that performance of the imaging direction change detection/correction processing is necessary and transitions to the processing of FIG. 3. For example, in the example described above, when the difference calculated for the placement location (Xd, Yd, Zd) of the marker 300c calculated on the basis of the camera pair of the camera 201a and the camera 201d exceeds the margin of error and the differences calculated for the placement locations of the marker 300c calculated on the basis of the other camera pairs are within the margin of error, the imaging direction detector 232 determines that the placement reliability of the camera 201d is low and transitions to the imaging direction change detection/correction processing of FIG. 3.

When the difference calculated for each camera pair is 0 or is within the margin of error (step S205; NO), the imaging direction detector 232 determines that there are no problems with the placement reliability of the cameras 201a to 201d and ends the processing.

Note that, in the example described above, the difference between the placement location of the marker 300 calculated by each camera pair and the known placement location of the marker 300 read from the memory 205 is calculated, but the present disclosure is not limited thereto. For example, a configuration is possible in which the placement locations of the marker 300 calculated the various camera pairs are compared with each other, and the placement reliability is determined to be low for the camera pair that calculates a placement location different from the placement location of the marker 300 calculated by the other plurality of camera pairs. For example, in a case in which the placement location (Xb, Yb, Zb) of the marker 300c calculated on the basis of the camera pair of the camera 201a and the camera 201b and the placement location (Xc, Yc, Zc) of the marker 300c calculated on the basis of the camera pair of the camera 201a and the camera 201c are the same, and only the placement location (Xd, Yd, Zd) of the marker 300c calculated on the basis of the camera pair of the camera 201a and the camera 201d exceeds the margin of error and is different than the placement locations calculated for the other camera pairs, a determination is made that the placement reliability of the camera 201d is low.

A configuration is possible in which the reliability determination processing described above is substituted for step S101 and step S102 of the imaging direction change detection/correction processing of FIG. 3. In such a case, in step S103, a configuration is possible in which, when the difference from the known placement location of the marker 300 or the difference from the placement location of the marker 300 calculated by the other plurality of camera pairs is too large to be handled by correction of the external parameter, a determination may be made that correction is impossible and an alert of an error is issued.

Embodiment 3

In Embodiments 1 and 2 described above, the camera 201 is fixed/placed in the space 500 (hereinafter referred to as "fixed camera scenario"). In contrast, in Embodiment 3, the camera 201 is fixed/placed to the moving body 100, and a case is described in which the camera 201 moves due to movement of the moving body 100 (hereinafter referred to as "moving camera scenario").

Figure 5:
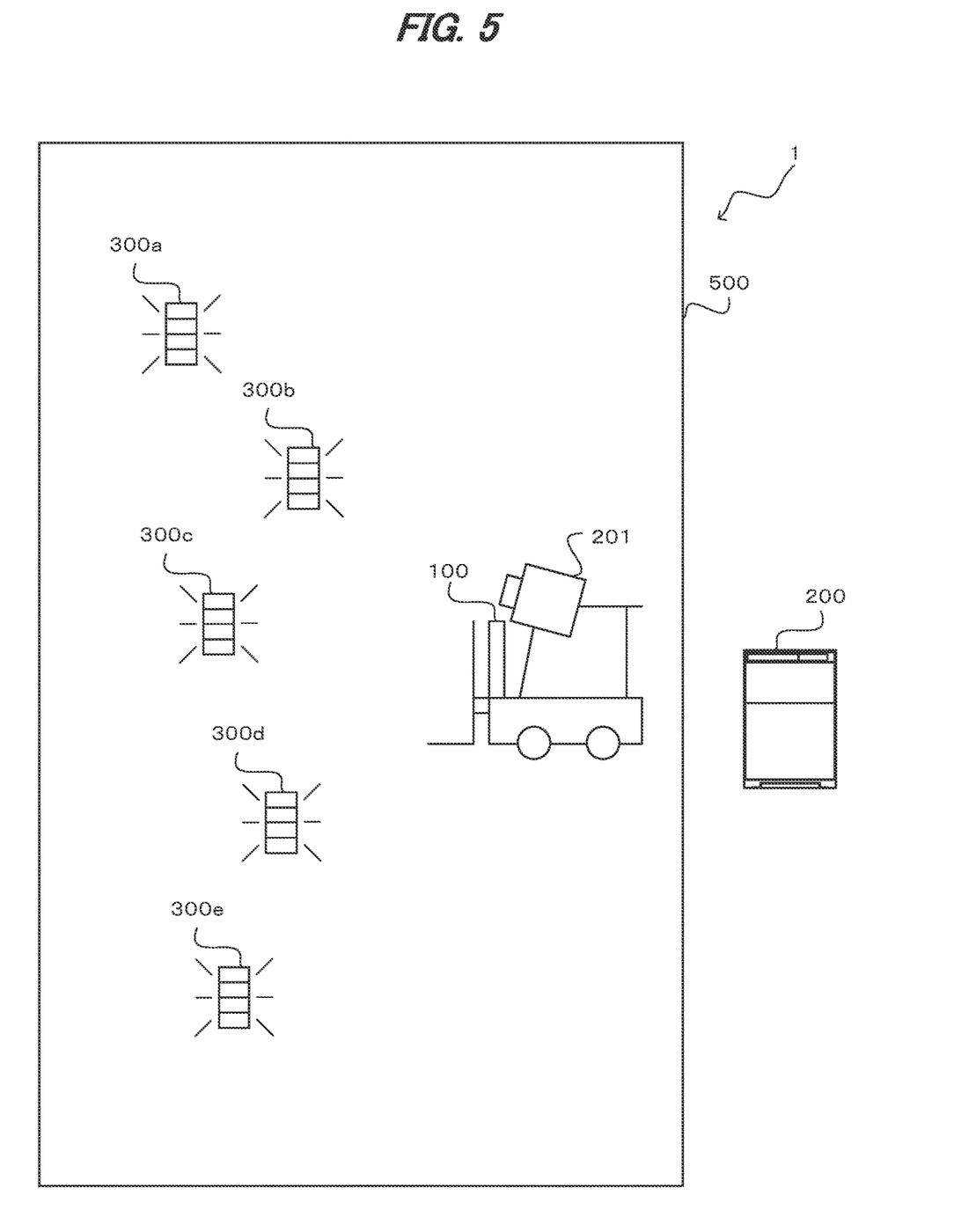
FIG. 5 is a drawing illustrating an example of a visible light communication system according to Embodiment 3 of the present disclosure.

FIG. 5 is a drawing illustrating the configuration of the visible light communication system 1 according to the present embodiment. FIG. 5 illustrates an example in which the moving body 100 is implemented as a forklift. As illustrated in FIG. 5, the visible light communication system 1 includes the moving body 100 that moves in the space 500, a camera 201 attached to the moving body 100, markers 300a, 300b, 300c, 300d that are light sources attached to a ceiling, wall, or the like of the space 500, and a server 200. The server 200 and the camera 201 are wirelessly connected to each other, and the server 200 is placed outside the space 500. Of course, a configuration is possible in which the server 200 is placed in the space 500. The other configurations that are the same as in FIG. 1 are marked with the same reference numerals, and descriptions thereof are forgone. The configuration of the server 200 is the same as the configuration illustrated in FIG. 2 other than the server 200 and the cameras 201a to 201d being wirelessly connected to each other and, as such, description thereof is forgone.

The camera 201 moves due to the movement of the moving body 100, images the plurality of markers 300, and measures the location where the camera exists, that is, the location of the moving body 100. In the moving camera scenario, the camera location can be measured by capturing two or more of the markers in the field of view of the camera. Since there are fewer observation points than in the fixed camera scenario, the accuracy requirements required for the camera parameters is high. Due to the camera 201 being attached to the moving body 100, the frequency at which the placement conditions of the camera 201 shift from the initial values due to vibration generated when the moving body 100 travels and the like, and declines in the location detection accuracy occur is higher than in the fixed camera scenario. Accordingly, in the moving camera scenario, it is important to correct shifts of the placement conditions of the camera 201 on a daily basis. For example, when the moving body 100 is a forklift, in many cases, the location where the forklift is parked at the end of work is operationally determined. In such a case, it is preferable to correct the shift of the direction that the camera is facing when the forklift returns to the operationally determined parking location (home position) of the forklift. It is expected that the locations of the markers visible from the home position are always the same. Accordingly, the operations of the imaging direction change detection/correction processing of the camera 201 are executed when the moving body 100 returns to the home position.

Figure 6:
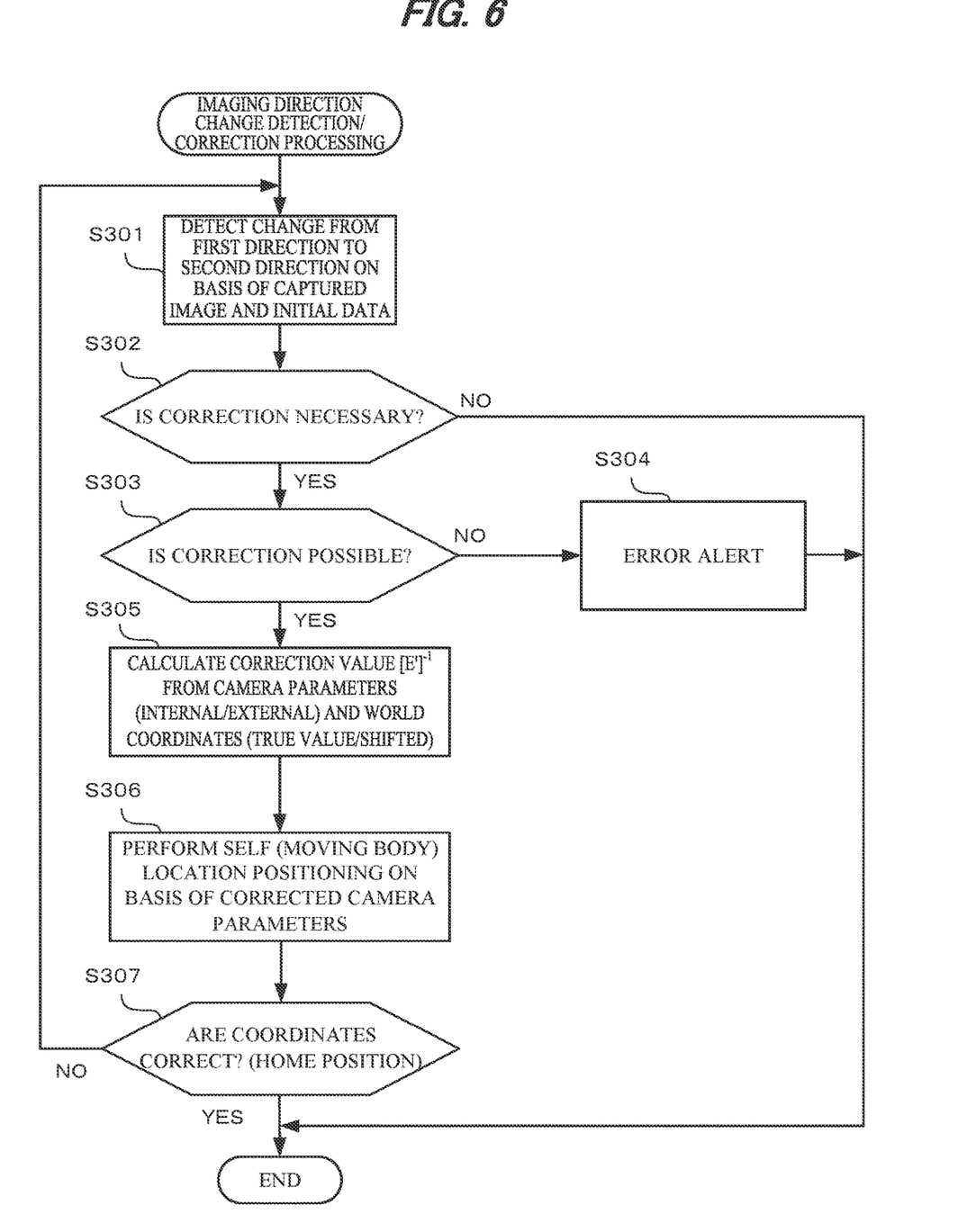
FIG. 6 is a flowchart illustrating an example of imaging direction change detection/correction processing according to Embodiment 3 of the present disclosure.

FIG. 6 is a flowchart illustrating an example of the operations of the imaging direction change detection/correction processing carried out by the server 200. This processing is automatically executed when the moving body 100 returns to the home position, but a configuration is possible in which this processing is executed on the basis of a user command.

When the moving body 100 returns to the home position, the camera 201 performs imaging in the space 500 from the home position. The imaging direction detector 232 of the controller 202 compares the captured image of the camera 201 acquired by the image acquirer 231 with the captured image of the camera 201 at the home position at initial camera placement, which is the initial data read from the memory 205. The captured image captured at the home position at the time of calibration at initial placement of the camera 201, and the calculated camera parameters are stored in advance in the memory 205 as initial data. The image locations or the placement locations of markers 300 having a common ID included in the captured images are compared, and a change from a first direction, that is the imaging direction of the camera 201 at initial camera placement, to a second direction is detected for the imaging direction of the camera 201 newly acquired by the image acquirer 231 (step S301).

Next, the correction determiner 234 of the controller 202 determines whether correction of the external parameter is needed on the basis of the change of the imaging direction detected by the imaging direction detector 232 (step S302).

When the detected amount of change from the first direction to the second direction is greater than or equal to the threshold, the correction determiner 234 determines that correction of the external parameter is necessary (step S302; YES) and, then, determines whether the correction of the external parameter is possible (step S303). When the detected amount of change from the first direction to the second direction is slight, there is no change, or the amount of change is less than the threshold, the correction determiner 234 determines that correction of the external parameter is not necessary (step S302; NO) and ends the processing. The determination of whether correction is necessary is the same as in step S102 of FIG. 3.

Next, in step S303, the correction determiner 234 determines whether correction of the external parameter is possible from the current captured image of the camera 201. The determination of whether correction is possible is the same as in step S103 of FIG. 3. When the location of the marker 300 is shifted greatly from the center of the image and, as such, cannot be adjusted by correcting the external parameter, the correction determiner 234 determines that correction is not possible (step S303; NO) and displays, on the display 207, that there is an error, thereby alerting the user (step S304). After alerting the user, the controller 202 ends the processing. When the location of the marker 300 is not shifted from the center of the image to a degree that makes adjustment by correcting the external parameter impossible, the correction determiner 234 determines that correction is possible (step S303; YES), and transitions to correction value calculation processing.

The correction value calculator 236 of the controller 202 calculates the correction value $[E']^{-1}$ by determining an inverse matrix on the basis of the camera parameters (the internal parameter and the external parameter), the known world coordinates (true values) of the marker 300 stored in the memory 205 for the two or more markers 300 in the captured image, and the (shifted) world coordinates of the marker 300 calculated from the current captured image (step S305).

When the correction value $[E']^{-1}$ is obtained in step S305, the location data acquirer 238 executes the correction of the camera parameters and acquires the location of the camera 201, that is, acquires the location data by positioning the location of the moving body 100 on the basis of the corrected camera parameters (step S306). The correction value $[E']^{-1}$ is the inverse matrix of the parameter [E'] of the amount of fluctuation with respect to the external parameter [E] caused by fluctuation in the imaging direction of the camera 201. Accordingly, the coordinates are corrected by multiplying the correction value by the parameter [E'] of the amount of fluctuation.

When the corrected location coordinates of the moving body 100 are obtained, these location coordinates are compared with the location coordinates of the home position, and a determination is made whether the obtained location coordinates match the location of the home position or, in other words, whether the obtained location coordinates are correct (step S307). The location coordinates of the home position are stored in advance in the memory 205. The controller 202 reads the location coordinates of the home position from the memory 205 and executes the determination described above. When the obtained location coordinates are correct (step S307; YES), the processing is ended. When the obtained location coordinates are not correct (step S307; NO), step S301 is returned to and the processing is repeated from step S301.

According to Embodiment 3, in a case in which the camera 201 is fixed/placed to the moving body 100, even when the imaging direction changes from the first direction at initial placement of the camera 201 to the second direction, the location data of the moving body 100 is acquired on the basis of captured images without returning the imaging direction of the camera 201 in the real world to the first direction from the second direction. Thus, calibration is unnecessary even when the direction the camera 201 is facing changes from the state at initial placement due to various factors, and location positioning accuracy can be restored without stopping the system during operation. Additionally, since the correction processing is executed at the home position location that is always returned to at the end of work, the correction processing is performed on a daily basis. Accordingly, the location positioning accuracy can be maintained in environments in which the attitude of the camera 201 is more likely to change due to the camera 201 being placed on the moving body 100.

Embodiment 4

In Embodiment 3 described above, the correction value $[E']^{-1}$ for correcting all of the rotation angles of the three axes, namely, pan, tilt, and roll, is obtained from the captured image. In contrast, in Embodiment 4, the camera 201 is provided with an inertial sensor, and the correction value $[E']^{-1}$ is obtained from the captured image after partially correcting the pan, the tilt, and the roll on the basis of sensor values. This configuration simplifies the calculation processing for obtaining the correction value $[E']^{-1}$.

The camera 201 is provided with an acceleration sensor and a gyrosensor as the inertial sensor. The acceleration sensor and the gyrosensor measure the movement state of the camera 201. Note that the inertial sensor may implemented as one of the acceleration sensor and the gyrosensor. Moreover, any sensor may be used that is capable of detecting the attitude of the camera 201. Additionally, the inertial sensor may be placed on the placement tool of the camera 201 that moves together with the camera 201. The acceleration sensor is a three-axis acceleration sensor, and measures changes in operating speed while the camera 201 is operating by detecting acceleration in three-axial directions that are orthogonal to each other. The gyrosensor is a three-axis angular velocity sensor, and measures changes in the operation direction while the camera 201 is moving by detecting the angular velocity rotating around each of the three axes that define the acceleration in the acceleration sensor.

Figure 7:
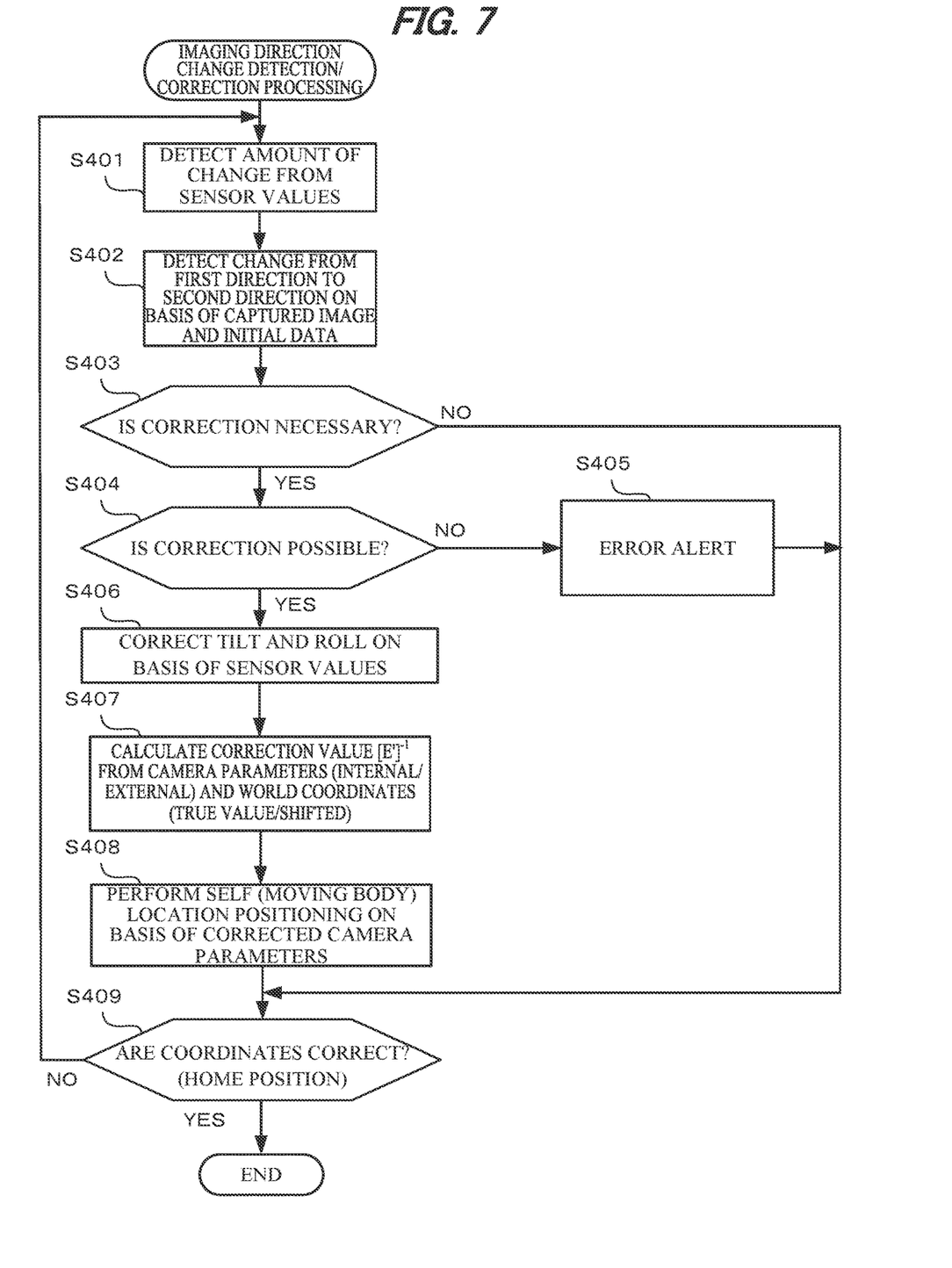
FIG. 7 is a flowchart illustrating an example of imaging direction change detection/correction processing according to Embodiment 4 of the present disclosure.

FIG. 7 is a flowchart illustrating an example of the operations of the imaging direction change detection/correction processing carried out by the server 200 in the present embodiment. As with Embodiment 3, this processing is executed when the moving body 100 returns to the home position.

When the moving body 100 returns to the home position, the amount of change is detected from the acceleration sensor and the gyrosensor placed on the camera 201 (step S401).

Additionally, the camera 201 performs imaging in the space 500 from the home position. The imaging direction detector 232 of the controller 202 compares the captured image of the camera 201 acquired by the image acquirer 231 with the captured image of the camera 201 at the home position at initial camera placement, which is the initial data read from the memory 205. A change from a first direction, that is the imaging direction of the camera 201 at initial camera placement, to a second direction is detected, on the basis of the comparison, for the imaging direction of the camera 201 acquired by the image acquirer 231 (step S402).

Next, the correction determiner 234 of the controller 202 determines whether correction of the external parameter is needed on the basis of the change of the imaging direction detected by the imaging direction detector 232 (step S403). When the amount of change from the first direction that is the imaging direction at initial placement of the camera 201 to the second direction is greater than or equal to the threshold, a determination is made that correction of the external parameter is necessary (step S403; YES) and, then, a determination is made whether the correction of the external parameter is possible (step S404). When the amount of change from the first direction that is the imaging direction at initial placement of the camera 201 to the second direction is slight, there is no change, or the amount of change is less than the threshold, the correction determiner 234 determines that correction of the external parameter is not necessary (step S403; NO) and ends the processing.

Next, in step S404, the correction determiner 234 determines whether correction of the external parameter is possible from the current captured image of the camera 201. When the location of the marker 300 is shifted greatly from the center of the image and, as such, cannot be adjusted by correcting the external parameter, the correction determiner 234 determines that correction is not possible (step S404; NO) and displays, on the display 207, that there is an error, thereby alerting the user (step S405). Then, the controller 202 ends the processing. When the location of the marker 300 is not shifted from the center of the image to a degree that makes adjustment by correcting the external parameter impossible, the correction determiner 234 determines that correction is possible (step S404; YES), and transitions to correction processing of the tilt and the roll based on the sensor values of the acceleration sensor and the gyrosensor (step S406).

In step S406, the tilt and the roll are corrected on the basis of the sensor values, and the pan is not corrected. Correction processing based on sensor values is complicated for the pan and, as such, the pan is corrected by continuously executed correction value calculation processing based on captured images. In step S406, by inputting the three-axis output of the acceleration sensor and the three-axis output of the gyrosensor into a Kalman filter or a low pass filter, three-axis data of the acceleration and three-axis data of the angular velocity with respect to the ground are calculated to estimate the gravitational direction. A configuration is possible in which an axis estimation method other than the Kalman filter or low-pass filter is used to estimate the gravitational direction. Upon estimation of the gravitational direction, the attitude is corrected to the gravitational direction estimated for the data of the acceleration sensor and the gyrosensor. As a result, the tilt and the roll are corrected.

Next, the correction value calculator 236 of the controller 202 calculates the correction value $[E']^{-1}$ by determining an inverse matrix on the basis of the camera parameters (the internal parameter and the external parameter), the known world coordinates (true values) of the marker 300 stored in the memory 205 for the two or more markers 300 in the captured image, and the (shifted) world coordinates of the marker 300 calculated from the current captured image (step S407). Since the tilt and the roll are already corrected in step S406, the load related to the calculation processing for obtaining the correction value $[E']^{-1}$ is reduced.

When the correction value $[E']^{-1}$ is obtained in step S407, the location data acquirer 238 executes the correction of the camera parameters and acquires the location of the camera 201, that is, acquires the location data by positioning the location of the moving body 100 on the basis of the corrected camera parameters (step S408).

When location coordinates of the moving body 100 are obtained, these location coordinates are compared with the location coordinates of the home position read from the memory 205, and a determination is made whether the obtained location coordinates match the location of the home position or, in other words, whether the obtained location coordinates are correct (step S409). When the obtained location coordinates are correct (step S409; YES), the processing is ended. When the obtained location coordinates are not correct (step S409; NO), step S401 is returned to and the processing is repeated from step S401.

According to Embodiment 4, in addition to the advantageous effects obtained in Embodiment 3, the number of parameters is fewer due to the rotation angles of the tilt and the roll, which are parameters for calculating the correction value $[E']^{-1}$, being corrected on the basis of the sensor values of the inertial sensor, and the processing for calculating the correction value $[E']^{-1}$ is simplified. Additionally, the calculation processing for the correction based on the sensor values of the inertial sensor is simplified due to the rotation angle of the pan, for which calculation processing in correction based on the sensor values of the inertial sensor is complicated, being corrected by the correction value $[E']^{-1}$.

In Embodiments 2, 3 and 4 described above, the parking accuracy at the home position of the moving body 100 is not considered. However, a configuration is possible in which video content analysis is used to relax the parking accuracy of the moving body 100. For example, by providing checkerboard or similar pattern at the home position, the parking attitude of the moving body 100 is determined and shifting of left-right direction rotation of the camera due to shifting of the parking direction of the moving body 100 is corrected.

In the embodiments described above, the CPU executes programs stored in the RAM or the ROM to function as the controller 202. However, for example, an Application Specific Integrated Circuit (ASIC), a Field-Programmable Gate Array (FPGA), various control circuitry, or other dedicated hardware may be provided instead of the CPU executing the programs stored in the RAM or the ROM, and this dedicated hardware may function as the controller 202. In such a case, the controller 202 may be realized in part by dedicated hardware and in part by software or firmware.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A location positioning device for a moving body, the location positioning device comprising:
   a communication device; and
   at least one processor configured to
      acquire, via the communication device, a captured image from a camera in which an imaging direction has changed from a first direction to a second direction, the captured image including at least one marker disposed in a space and at least one moving body that moves in the space,
      detect, based on the captured image and initial data, a change of the imaging direction from the first direction to the second direction, and
      when the change of the imaging direction to the second direction is detected, determine, using information on fluctuation of location information of the at least one marker, whether the imaging direction is correctable, and
      when the imaging direction is determined to be correctable, acquire, using the information on fluctuation of the location information of the at least one marker, location data of the at least one moving body without returning the imaging direction of the camera in a real world to the first direction from the second direction.

2. The location positioning device according to claim 1, wherein the initial data includes world coordinate data that is data of coordinates at which the marker is disposed.

3. The location positioning device according to claim 1, wherein the imaging direction of the camera changes from the first direction to the second direction due to an external factor caused by vibration or an aging factor.

4. The location positioning device according to claim 1, wherein when the at least one processor detects a change to the second direction, the at least one processor calculates a correction value that corrects, based on image coordinate data of the at least one marker included in the captured image and the world coordinate data of the at least one marker, a fluctuation in the imaging direction of the camera.

5. The location positioning device according to claim 4, wherein the at least one processor acquires, based on the correction value, the location data.

6. A location positioning device for a moving body, the location positioning device comprising:
   a communication device; and
   at least one processor configured to
      acquire, via the communication device, a captured image in which a plurality of markers disposed in a space is captured, from a camera that is fixed to a moving body and in which an imaging direction has changed from a first direction to a second direction,
      detect, based on the captured image and initial data, a change of the imaging direction from the first direction to the second direction, and
      when the change of the imaging direction to the second direction is detected, determine, using information on fluctuation of location information of at least one marker of the plurality of markers, whether the imaging direction is correctable, and
      when the imaging direction is determined to be correctable, acquire, using the information on fluctuation of the location information of the at least one marker, location data of the moving body without returning the imaging direction of the camera in a real world to the first direction from the second direction.

7. The location positioning device according to claim 6, wherein the initial data includes world coordinate data that is data of coordinates at which the marker is disposed.

8. The location positioning device according to claim 6, wherein the imaging direction of the camera changes from the first direction to the second direction due to an external factor caused by vibration or an aging factor.

9. The location positioning device according to claim 6, wherein when the at least one processor detects a change to the second direction, the at least one processor calculates a correction value that corrects, based on image coordinate data of the plurality of markers included in the captured image and world coordinate data of the plurality of markers, a fluctuation in the imaging direction of the camera.

10. The location positioning device according to claim 9, wherein the at least one processor acquires, based on the correction value, the location data.

11. The location positioning device according to claim 6, wherein the captured image is an image captured when the moving body is located at a home position.

12. The location positioning device according to claim 6, wherein
   the moving body includes an inertial sensor that detects an attitude of the camera, and
   the attitude of the camera, except at least a pan, is corrected based on a sensor value of the inertial sensor.

13. A location positioning method for a moving body, executable by a location positioning device including a communication device and at least one processor, the method comprising:
   acquiring, by the at least one processor, via the communication device, a captured image from a camera in which an imaging direction has changed from a first direction to a second direction, the captured image including at least one marker disposed in a space and at least one moving body that moves in the space,
   detecting, by the at least one processor and based on the captured image and initial data, a change of the imaging direction from the first direction to the second direction, and
   when the change of the imaging direction to the second direction is detected, determining, by the at least one processor and using information on fluctuation of location information of the at least one marker, whether the imaging direction is correctable, and
   when the imaging direction is determined to be correctable, acquiring, by the at least one processor and using the information on fluctuation of the location information of the at least one marker, location data of the at least one moving body without returning the imaging direction of the camera in a real world to the first direction from the second direction.

14. The location positioning method according to claim 13, wherein the initial data includes world coordinate data that is data of coordinates at which the marker is disposed.

15. The location positioning method according to claim 13, wherein the imaging direction of the camera changes from the first direction to the second direction due to an external factor caused by vibration or an aging factor.

16. The location positioning method according to claim 13, wherein when the at least one processor detects a change to the second direction, the at least one processor calculates a correction value that corrects, based on image coordinate data of the at least one marker included in the captured image and world coordinate data of the at least one marker, a fluctuation in the imaging direction of the camera.

17. The location positioning method according to claim 16, wherein the at least one processor acquires, based on the correction value, the location data.

18. A location positioning method for a moving body, executable by a location positioning device including a communication device and at least one processor, the method comprising:
  acquiring, by the at least one processor, via the communication device, a captured image in which a plurality of markers disposed in a space is captured, from a camera that is fixed to a moving body and in which an imaging direction has changed from a first direction to a second direction,
  detecting, by the at least one processor and based on the captured image and initial data, a change of the imaging direction from the first direction to the second direction, and
  when the change of the imaging direction to the second direction is detected, determining, by the at least one processor and using information on fluctuation of location information of at least one marker of the plurality of markers, whether the imaging direction is correctable, and
  when the imaging direction is determined to be correctable, acquiring, by the at least one processor and using the information on fluctuation of the location information of the at least one marker, location data of the moving body without returning the imaging direction of the camera in a real world to the first direction from the second direction.

19. The location positioning method according to claim 18, wherein the initial data includes world coordinate data that is data of coordinates at which the marker is disposed.

20. The location positioning method according to claim 18, wherein the imaging direction of the camera changes from the first direction to the second direction due to an external factor caused by vibration or an aging factor.

21. The location positioning method according to claim 18, wherein when the at least one processor detects a change to the second direction, the at least one processor calculates a correction value that corrects, based on image coordinate data of the plurality of markers included in the captured image and world coordinate data of the plurality of markers, a fluctuation in the imaging direction of the camera.

22. The location positioning method according to claim 21, wherein the at least one processor acquires, based on the correction value, the location data.

23. The location positioning method according to claim 18, wherein the captured image is an image captured when the moving body is located at a home position.

24. The location positioning method according to claim 18, wherein
  the moving body includes an inertial sensor that detects an attitude of the camera, and
  the attitude of the camera, except at least a roll, is corrected based on a sensor value of the inertial sensor.

* * * * *